(12) United States Patent
Masuda

(10) Patent No.: US 9,138,810 B2
(45) Date of Patent: Sep. 22, 2015

(54) WORK SUPPLY APPARATUS AND MACHINE TOOL PROVIDED WITH THE WORK SUPPLY APPARATUS

(75) Inventor: Masaaki Masuda, Kitasaku-gun (JP)

(73) Assignee: CITIZEN MACHINERY CO., LTD., Kitasaku-gun, Nagano (JP)

(*) Notice: Subject to any disclaimer, the term of this patent is extended or adjusted under 35 U.S.C. 154(b) by 994 days.

(21) Appl. No.: 13/138,702

(22) PCT Filed: Feb. 23, 2010

(86) PCT No.: PCT/JP2010/001167
§ 371 (c)(1),
(2), (4) Date: Sep. 20, 2011

(87) PCT Pub. No.: WO2010/109765
PCT Pub. Date: Sep. 30, 2010

(65) Prior Publication Data
US 2012/0013062 A1 Jan. 19, 2012

(30) Foreign Application Priority Data

Mar. 27, 2009 (JP) ................................ 2009-079655
Mar. 27, 2009 (JP) ................................ 2009-079656

(51) Int. Cl.
*B23Q 1/25* (2006.01)
*B23B 13/02* (2006.01)
(Continued)

(52) U.S. Cl.
CPC ............... *B23B 13/022* (2013.01); *B23Q 7/06* (2013.01); *B23B 2270/16* (2013.01); *B66F 7/22* (2013.01)

(58) Field of Classification Search
USPC ........................................................ 269/55
See application file for complete search history.

(56) References Cited

U.S. PATENT DOCUMENTS 2,682,065 A * 6/1954 Nelson et al. .................. 15/88.3
6,598,777 B2 * 7/2003 Osuga et al. ................... 227/136
(Continued)

FOREIGN PATENT DOCUMENTS

EP 1731248 A1 * 12/2006 .............. B23B 13/02
JP 36-13400 8/1961
(Continued)

*Primary Examiner* — Lee D Wilson
*Assistant Examiner* — Alvin Grant
(74) *Attorney, Agent, or Firm* — Manabu Kanesaka

(57) ABSTRACT

A work supply apparatus that can cope with a variation (decrease or increase) in length of the work and can eliminate adverse effects caused by vibration or the like and a machine tool provided with this work supply apparatus are aimed at to be provided.
Provided is a work supply apparatus that is provided with a work accommodation part (110), a pressing member (130) which presses the works (W) accommodated in the work accommodation part out from the work accommodation part (110), and the work replenishing part (122) which replenishes works to the work accommodation part, and replenishes works to be introduced to the work supply part, and supplies the work in the work accommodation part to a predetermined operation position by means of the pressing member (130), wherein the work replenishing part has a work positioning member (125) which positions the work at a position where the work can be replenished to the work accommodation part, the work positioning member (125) is provided in a manner that the position thereof can be freely adjusted according to the work, and the pressing member (130) has a configuration that allows the amount of movement to be adjusted based on the distance between the reference position (122a) and the work positioning member (125).

11 Claims, 6 Drawing Sheets

(51) Int. Cl.
   *B23Q 7/06*   (2006.01)
   *B66F 7/22*   (2006.01)

(56) References Cited

U.S. PATENT DOCUMENTS

| | | | |
|---|---|---|---|
| 8,820,726 B2* | 9/2014 | Yeom | 269/55 |
| 2002/0060234 A1* | 5/2002 | Osuga et al. | 227/120 |
| 2007/0199415 A1* | 8/2007 | Ando et al. | 82/127 |
| 2011/0295414 A1* | 12/2011 | Lambert | 700/217 |
| 2012/0056364 A1* | 3/2012 | DuBose et al. | 269/55 |
| 2012/0068395 A1* | 3/2012 | Daeschner | 269/55 |
| 2012/0090541 A1* | 4/2012 | Wang | 118/500 |
| 2012/0223468 A1* | 9/2012 | Baumgarte et al. | 269/55 |
| 2012/0251964 A1* | 10/2012 | Inagawa et al. | 432/11 |

FOREIGN PATENT DOCUMENTS

| | | | |
|---|---|---|---|
| JP | 61-127123 | 8/1986 | |
| JP | 03-026440 | 2/1991 | |
| JP | 2007-276102 | 10/2007 | |
| WO | WO 2005095033 A1 * | 10/2005 | B23B 13/12 |

* cited by examiner

WORK SUPPLY APPARATUS AND MACHINE TOOL PROVIDED WITH THE WORK SUPPLY APPARATUS

RELATED APPLICATIONS

The present application is National Phase of International Application No. PCT/JP2010/001167 filed Feb. 23, 2010, and claims priority from Japanese Applications No. 2009-079655 filed Mar. 27, 2009 and No. 2009-079656 filed Mar. 27, 2009.

TECHNICAL FIELD

The present invention relates to a work supply apparatus which supplies a work to an operation position of an operating machine such as a machine tool and an assembly tool, as well as to a machine tool provided with this work supply apparatus.

BACKGROUND ART

Conventionally, an apparatus is known as a work supply apparatus which supplies a work a machine tool such as an automatic lathe in which a plurality of works are accommodated in a cylindrical work accommodation part positioned within a main spindle such that they are aligned, a work positioned at the tail end is pressed by means of a pestle-like pressing member within the work accommodation part so that the work moves for a distance which is equal to the length of a single work, and works are sent to the chuck of the main spindle one by one from the work accommodation part (see Patent Document 1, for example).

In the work supply apparatus disclosed in Patent Document 1, a magazine 6 in which an accommodation part which stacks and accommodates a plurality of materials (work) 7 is integrally provided in a sending pestle 5 corresponding to the pressing member and a cylindrical part corresponding to the work accommodation part. In this work supply apparatus, the accommodation part is used as a work replenishing part, and the material 7 is replenished from the accommodation part (work replenishing part) to a space which is formed when the sending pestle 5 is retracted with a material 8 being held by a chuck 4.

RELATED ART DOCUMENTS

Patent Documents

Patent Document 1: JP-B-S36-13400

SUMMARY OF THE INVENTION

Problems to be Solved by the Invention

In the work sending apparatus disclosed in Patent Document 1, the width in the main spindle axial direction of the accommodation part is formed to have the same size as the length of a single material (work) 7, and the work is positioned at a position at which the work can be replenished to the cylindrical part. Therefore, when the length of the work varies, i.e. increases or decreases, it is necessary to exchange the accommodation part by removing it from the cylindrical part or to exchange the magazine itself. Also, the amount of movement of the sending pestle 5 is also required to be adjusted. Therefore, there was a problem that a heavy burden was imposed on a worker and a worker could not cope with the change in size of the work easily.

In addition, in the work supply apparatus disclosed in Patent Document 1, since the accommodation part and the cylindrical part are integrally formed, if vibration or the like is transmitted to the cylindrical part during the processing of a work, for example, the accommodation part also suffers from vibration or the like. As a result, not only noises or the like are generated, but also adverse effects may be exerted on accommodation or replenishment of the material (work) 7. Under such circumstances, there has been a demand for eliminating adverse affects caused by vibration or the like.

The present invention has been made in view of the above-mentioned problems, and an object thereof is to provide a work supply apparatus which can easily cope with a change (increase or decrease) in the length of a work and can eliminate adverse effects caused by vibration or the like, as well as to provide a machine tool provided with the work supply apparatus.

Means for Solving the Problems

In order to solve the above-mentioned problems, the work supply apparatus of the present invention is a work supply apparatus comprising a work accommodation part in which a plurality of works are accommodated such that they are aligned, a pressing member that moves so as to press the works accommodated within the work accommodation part, thereby to push a predetermined number of works out from the work accommodation part, and a work replenishing part which replenishes works to the work accommodation part, which replenishes works to be introduced to the work replenishing part to the work accommodation part; and supplies the work in the work accommodation part to a predetermined operation position by means of the pressing means, wherein the work replenishing part has a work positioning member which positions the work at a position where the work can be replenished to the work accommodation part, the work positioning member is provided in a manner that the position thereof can be freely adjusted relative to the reference position of work introduction according to the length of the work and the quantity of works to be replenished, and the pressing member has a configuration which allows the amount of movement thereof can be adjusted based on the distance between the reference position and the work positioning member.

In this case, the work positioning member is positioned at a position which is away from the reference surface for a distance which is equal to the total lengths of works to be replenished at one time and the pressing member moves for a distance which is equal to the length of a single work such that the single work is pushed out from the work accommodation part.

Further, a work moving means that moves the work which has been positioned by the work positioning member towards the work accommodation part may be provided.

Due to such a configuration, when the length of a work varies (increases or decreases), the position of the work positioning member is adjusted relative to the reference position of work introduction, whereby the work is positioned based on the reference position. As a result, replenishing of works to the work accommodation part can be conducted easily based on the reference position in correspondence with works differing in length.

On the other hand, since the amount of movement is adjusted based on the distance between the reference position and the work positioning member, without adjusting the movement amount of a pressing rod separately, works to be accommodated within the work accommodation part can be supplied easily to the operation position.

As a result, replenishing of works can be conducted with the work accommodation part being mounted on the operation machine, whereby a long-time, continuous operation by the operation machine can be conducted without exchanging the work accommodation part. Further, a plurality of kinds of works differing in length can be supplied.

The work supply apparatus may have a configuration in which the work replenishing part is formed as a separate part which is distant from the work accommodation part.

In this case, the work accommodation part is provided such that it can move back and forth such that the work in the work accommodation part and the work at the operation position are distant from each other.

Due to such a configuration, if vibration or the like are transmitted to the work accommodation part, the vibration or the like are not transmitted to the work replenishing part which is provided as a separate part which is distant from the work accommodation part. As a result, noises can be suppressed and adverse effects on replenishing or the like of works can be prevented. Further, if the work accommodation part is provided so that it can move back and forth such that the work in the work accommodation part and the work at the operation position are distant from each other. As a result, the work replenishing part does not hinder the movement of the work accommodation part, whereby only the work accommodation part can be moved, and therefore, a large-scale back-and-forth movement is no longer necessary.

The machine tool of the present invention is a machine tool that is provided with the work supply apparatus as mentioned above. In this case, the operation position is a position where a work is held by the machine tool.

Advantageous Effects of the Invention

According to the present invention, it is possible to provide a work supply apparatus which can cope with a change (decrease or increase) in length of a work, and can eliminate adverse effects caused by vibration or the like, as well as a machine tool provided with the work supply apparatus.

BEST MODE FOR CARRYING OUT THE INVENTION

Hereinbelow, an embodiment in which the work supply apparatus of the present invention is applied to an automatic lathe will be explained in detail with reference to the drawings.

Figure 1A:
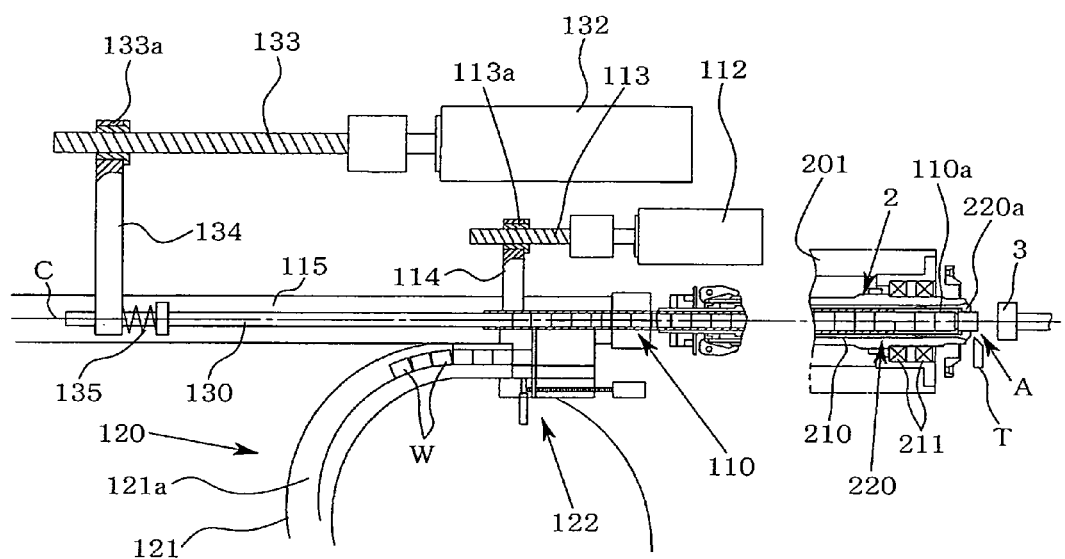
FIGS. 1A and 1B are plan views of the work supply apparatus according to one embodiment of the invention, explaining the configuration thereof.
Figure 1B:
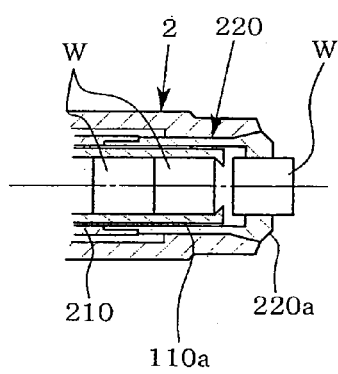
Figure 2A:
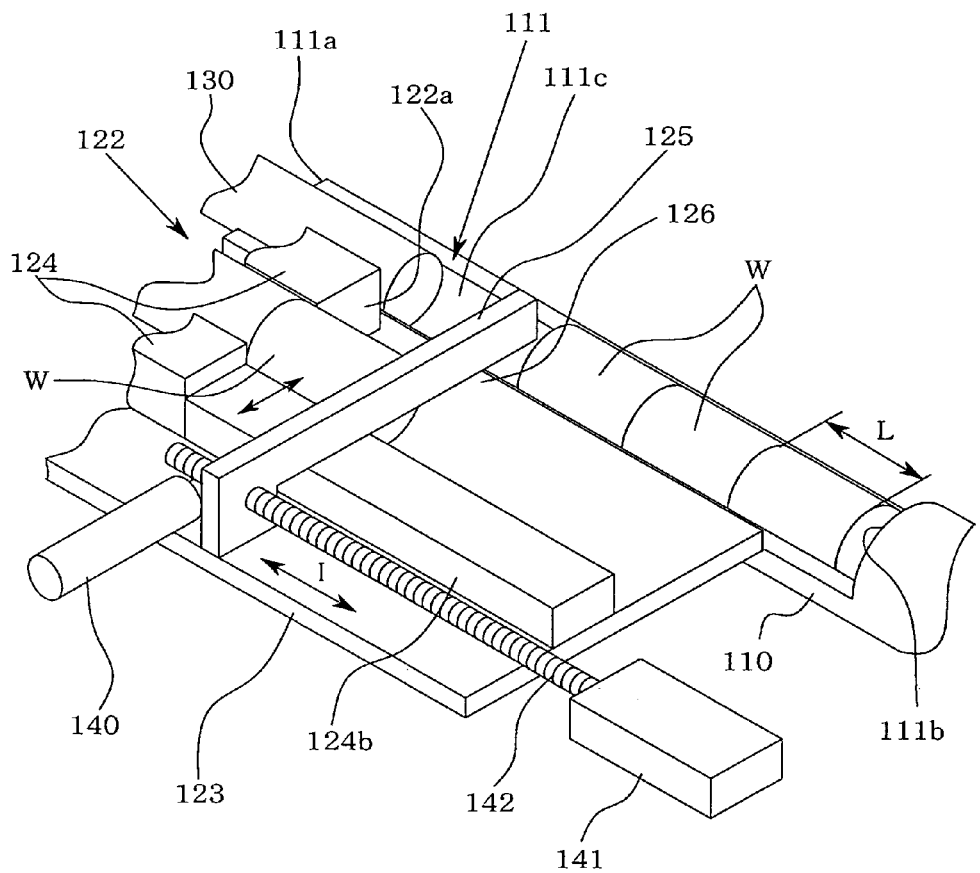
FIG. 2A is a partially enlarged oblique view for explaining the outline of the work replenishing part for replenishing works to the work accommodation part.
Figure 2B:
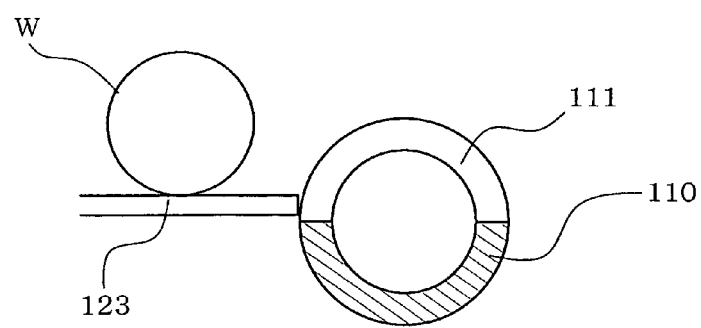
FIG. 2B is a view for explaining the relationship between the work accommodation part and the work supply apparatus.

FIGS. 1A and 1B are plan views of the work supply apparatus according to a first embodiment of the present invention, explaining the configuration thereof; FIG. 2A is a partially enlarged oblique view for explaining the outline of the work replenishing part which replenishes works to the work accommodation part; and FIG. 2B is a view for explaining the relationship between the work accommodation part and the work supply apparatus.

[Automatic Lathe]

The automatic lathe has, on a headstock 201, a main spindle 2 which is rotatably supported by a bearing 211. In the following explanation, the front end side (the right side of FIG. 1A) is stated as "front" and the rear end side (the left side of FIG. 1A) is stated as "rear". A chuck 220 is provided on the front end of the main spindle 2. This chuck 220 is arranged on the front end of a draw bar 210 which moves back and forth in the through hole of the main spindle 2. Due to the back-and-forth movement of the draw bar 210, a holding claw 220a which holds the work W opens and closes. Also not shown, the automatic lathe has a tool rest provided with the tool T. As in the case of conventional automatic lathes, the work W is held by the chuck 220 of the main spindle 2, and the work W which is held by the chuck is processed by means of a tool T such as a tool bit and a drill. In this embodiment, the position at which the work W is arranged when the work W is held by the chuck 220 is referred to as an operation position A.

[Work Supply Apparatus]

The work supply apparatus of the present invention has a work accommodation part 110 formed in a cylindrical shape, a pressing rod 130 as a pressing member which has been inserted from the rear end of the work accommodation part 110 to the work accommodation part 110, and a work replenishing part 122 which replenishes a work W to the work accommodation part 110. In this work supply apparatus, while the work W is replenished to the work accommodation part 110 from the work replenishing part 122, the work W is supplied to the operation position A from the work accommodation part 110 by means of the pressing rod 130.

[Work Accommodation Part]

The work accommodation part 110 is inserted concentrically with the main spindle 2 from the rear end to the through hole of the main spindle 2. The rear part of the work accommodation part 110 is protruded from the rear end of the main spindle 2, and is supported such that it can move back and forth freely by a supporting frame 115 along the main spindle axial line C.

At the rear end of the work accommodation part 110, a work input port 111 is formed by notching part of the peripheral wall. The work W is supplied to the work accommodation part 110 through this work input port 111, whereby a plurality of works are accommodated within the work accommodation part 110. The works W in the work accommodation part 110 are aligned in a single line on the main spindle axial line C.

Further, at the front end of the work accommodation part 110, a stopper 110a is provided such that it prevents the work W from protruding from the front end of the work accommodation part 110. This stopper 110a may be formed of a leaf spring which is formed by folding part of the front end of the work accommodation part 110 inwardly.

A motor 112 is arranged in parallel with the work accommodation part 110. A helical shaft 113 which is rotated by the driving of the motor 112 is arranged in parallel with the main spindle axial line C. A nut 113a, which moves back and forth along with the helical shaft 113 by the driving of the helical shaft 113, is screwed to this helical shaft 113. The nut 113a is provided at the front end of a connecting member 114 which is provided in a protruded manner in the work accommodation part 110.

The motor 112, the helical shaft 113, the nut 113a or the like constitute work accommodation part driving means. The work accommodation part 110 moves back and forth in the same direction of the main spindle axial line C by the driving of the motor 112.

[Pressing Rod]

The pressing rod 130 is arranged in parallel with the main spindle axial line C. A connection member 134 is provided in a protruded manner in the pressing rod 130 through a leaf 135.

The motor 132 is arranged in parallel with the work accommodation part 110. The helical shaft 133, which is allowed to rotate by the driving of the motor 132, is arranged in parallel with the pressing rod 130. A nut 133a which moves back and forth along with the helical shaft 133 by the driving of the helical shaft 133 is screwed to this helical shaft 133. The nut 133a is provided in the connection member 134.

The motor 132, the helical shaft 133, the nut 133a or the like constitute a pressing rod driving means. The pressing rod 130 moves back and forth by the driving of the motor 132 in the work accommodation part 110 in the same direction as the main spindle axial line C using the leaf 135 as a buffer means.

The pressing rod 130 is allowed to move by abutting it against the work W which is positioned at the tail end of the works in the work accommodation part 110, and all the works are pushed forward in an integral manner. As a result, all the works in the work accommodation part 110 can be moved forward against the elastic force of a stopper 110a, whereby the works W can be discharged from the front end of the work accommodation part 110.

In this embodiment, the amount of movement of the pressing rod 130 after abutting the work W at the tail end is set to be L; the length of a single work W, which is equal to the length of the work W in the main spindle axial line direction C with a predetermined length α being added. Due to the above-mentioned movement of the pressing rod 130, a single work W positioned at the front end of the work accommodation part 110 is pushed out from the front end of the work accommodation part 110.

In the work accommodation part 110, the front end thereof is positioned immediately after a holding claw 220a of the chuck 220 so as to allow the work W which has been pushed out from the work accommodation part 110 to be positioned at the operation position A by allowing the work W to be pushed out from the front end of the work accommodation part 110 as mentioned above.

As a result, it is possible to push the work W out from the front end of the work accommodation part 110 by means of the pressing rod 130, and to supply the work to the operation position A.

As for the α, a value which does not allow at least two works W to be pushed out from the work accommodation part 110 is set taking into a consideration a variation in length of each of the works W.

[Work Supply Part]

The work supply part 122 is arranged such that it is adjacent to the work accommodation part 110. As shown in FIG. 2B, the work replenishing part 122 is formed as a separate part which is distant from the work accommodation part 110 so that the work replenishing part 122 does not hinder the back-and-forth movement of the work accommodation part 110.

The work replenishing part 122 has a work mounting plate 123 on which the work W is mounted. On this work mounting plate 123, a pair of left and right side walls 124 is vertically provided. The left and right side walls 124 are provided such that the end surfaces thereof are aligned at the same position in the main spindle main axis direction C. The gap between the right and left side walls 124 forms an introduction path for the work W. The work W is supplied to the work replenishing part 122 through this introduction path. The right and left side walls 124 guides the right and left of the work W such that the work W passing the introduction path can be prevented from rolling.

In the embodiment, the work W is introduced to the work replenishing part 122 by means of a parts feeder 120. This parts feeder 120 is provided with a ball 121 in which a plurality of works are stored and a work transmission path 121a formed in this ball 121. At the end of the transmission path 121a, the side walls 124 and 124 are positioned. The works W in the ball 121 are continuously and sequentially introduced from the transmission path 121a to the introduction path.

[Work Positioning Member]

From the left end to the right end of the work mounting plate 123, a plate-like work positioning member 125 is provided. As mentioned above, the works W which are introduced from the work replenishing part 122 are prevented from moving by abutting against the work positioning member 125, whereby the works are positioned within the work replenishing part 122.

On the fixing part of the work replenishing part 122 (work mounting plate 123, for example), a motor 141 is provided. To this motor 141, a helical shaft 142 which is arranged in parallel with the main spindle axial line C is connected such that it can be rotated by the driving of the motor 141. In this helical shaft 142, the helical hole of the work positioning means 125 is screwed.

When the helical shaft 142 is rotated by the driving of the motor 141, the work positioning means 125 moves back and forth on the mounting plate 123 in parallel with the main spindle axial line C in the direction indicated by the arrow I. As mentioned above, the motor 141, the helical shaft 142 or the like constitute the position adjustment means which conducts position adjustment by allowing the work positioning means 125 to move back and forth on the work mounting plate 123.

The position adjusting means positions the work positioning member 125 using the side surface of the side wall 124 as the reference surface 122a. In this embodiment, the work positioning member 125 is set such that it is positioned at a position which is away from the reference surface 122a for the distance L, which is equals to the length of a single work W.

As a result, the single work W is positioned such that it is protruded from the reference surface 122a so that one end thereof is positioned at the substantially same position as that of the reference surface 122a.

[Pressing Member]

In the work positioning member 125, a notch 126 is formed below a part at which it abuts against the work W. Within this notch 126, a pressing member 124b extending from the end surface of the side wall 124 to the front end of the work mounting plate 123 is arranged. This pressing member 124b is connected to a cylinder 140 which is provided in a fixing part of the work replenishing part 122 (work mounting plate 123, for example). By the driving of the cylinder 140, the pressing member 124b moves back and forth relative to the work accommodation part 110.

By allowing the pressing member 124b to move towards the work accommodation part 110, the work W which has been positioned by means of the work positioning member 125 can be pushed out towards the work accommodation part 110.

In this embodiment, the cylinder 140, the pressing member 124b or the like constitute a work moving means which allows the work W which has been positioned to move towards the work accommodation part 110.

The position of the work accommodation part 110 is, when it is replenished with the work W from the work replenishing part 122, is adjusted such that a rear end edge 111a of the work input port 111 is positioned at the same position or in the rear position of the reference surface 122a. The width in the main spindle axial direction C of the work input port 111 is set such that a front end edge 111b is positioned ahead from the reference surface 122a for a distance which is equal to the above-mentioned length L of a single work. As a result, the work input port 111 is positioned on the side of the work W which is positioned by the work positioning member 125.

In the manner mentioned above, the work W to be introduced from the parts feeder 120 to the work replenishing part 122 is positioned by abutting against the work positioning member 125 using the reference surface 122a as a reference, is pushed out towards the work accommodation part 110 by means of the pressing member 124b, moves on the work mounting plate 123 while being guided by the reference surface 122a and the work positioning member 125, drops from the work mounting plate 123, is input to the work input port 111, and is replenished to the work accommodation part 110 one by one.

When the work W is replenished to the work accommodation part 110, the position of the pressing rod 130 is adjusted by means of a pressing rod driving means such that the tip thereof is positioned at the same position or in the rear position of the reference surface 122a, whereby the pressing rod does not interfere with the work W to be replenished.

The work accommodation driving means (motor 112), the pressing rod driving means (motor 132), the work replenishing part 122 (motor 141 and the cylinder 140) are controlled by an NC apparatus as a machine tool. This NC apparatus has a configuration that it can automatically set the length L which is equal to the length of a single work W according to the length of the work W to be input in the NC apparatus.

In this work supply apparatus, the position adjusting means and the pressing rod driving means are controlled by the instructions of the NC apparatus. The work positioning member 125 is positioned relative to the reference surface 122a according to the length L which is equal to the length of a single work W, and based on the distance between the reference surface 122a and the work positioning member 125, the amount of the movement of the pressing rod 130 is automatically adjusted to the length L which is equal to the length of the single work W. That is, in this embodiment, the pressing rod driving means in which the amount of movement of the pressing rod 130 is set by the NC apparatus constitutes a movement amount adjusting means which adjusts the amount of movement of the pressing rod 130 based on the distance between the reference surface 122a and the work positioning member 125. As a result, it is possible to replenish the work W one by one from the work replenishing part 122 to the work accommodation part 110, and to supply the work W in the work accommodation part 110 to the operation position A one by one by means of the pressing rod 130.

[Action]

Next, the action of the above-mentioned work supply apparatus will be explained with reference to FIGS. 3 and 4.

Figure 3A:
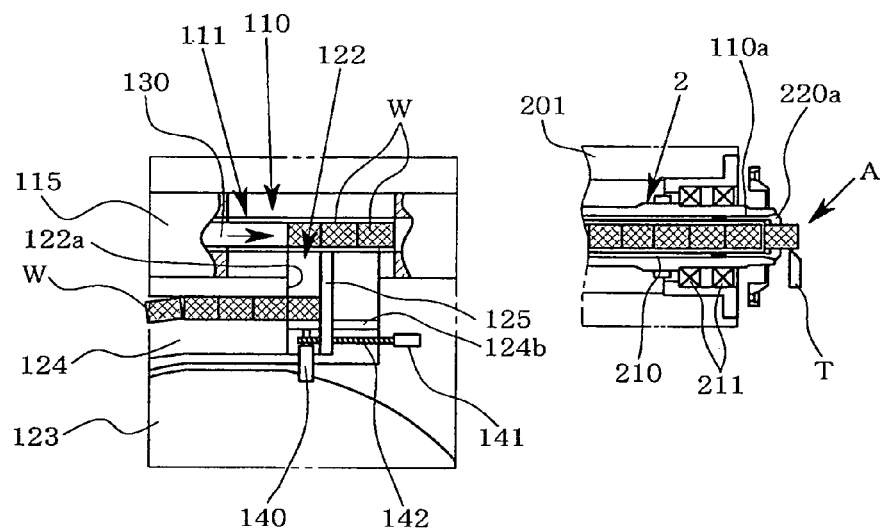
FIGS. 3A to 3C are views for explaining the operation of the work supply apparatus of this embodiment.

As shown in FIG. 3A, the work W which is held by the chuck 220 at the operation position A is processed by an automatic lathe. In this embodiment, the work accommodation part 110, after supplying the work W to the operation position A, slightly retracts such that a gap will be formed between the work W held by the chuck 220 and the front end of the work accommodation part 110. In addition, the work accommodation part 110 is supported as mentioned above, and does not rotate freely around the axial core.

Therefore, the automatic lathe in this embodiment can allow the work W to be rotated integrally with the main spindle 2, and can stably conduct processing without contacting the work W which rests within the work accommodation part 110. Further, the work accommodation part 110 can stably accommodate the work W in a standstill state.

Figure 3B:
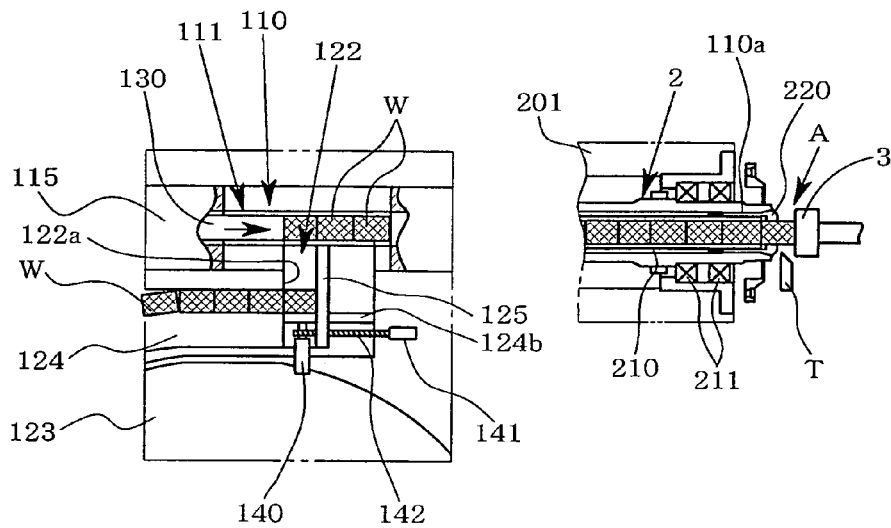
Figure 3C:
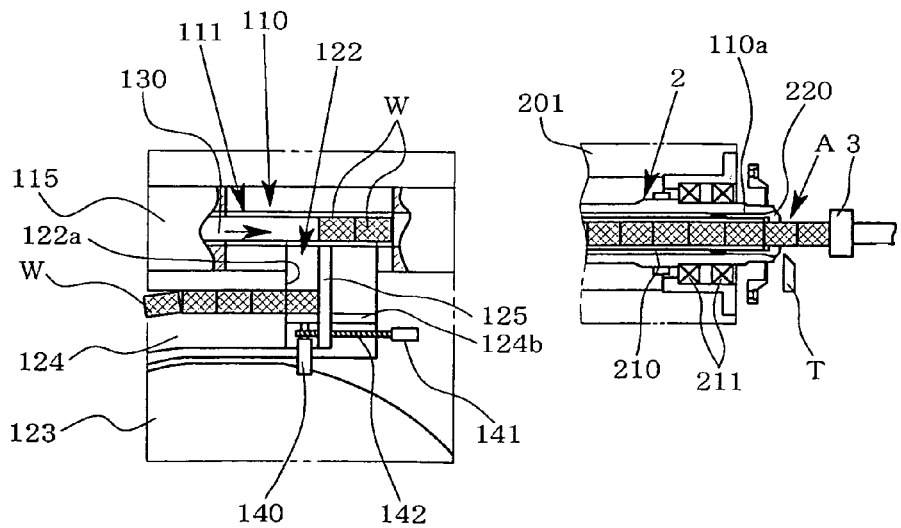
Figure 4A:
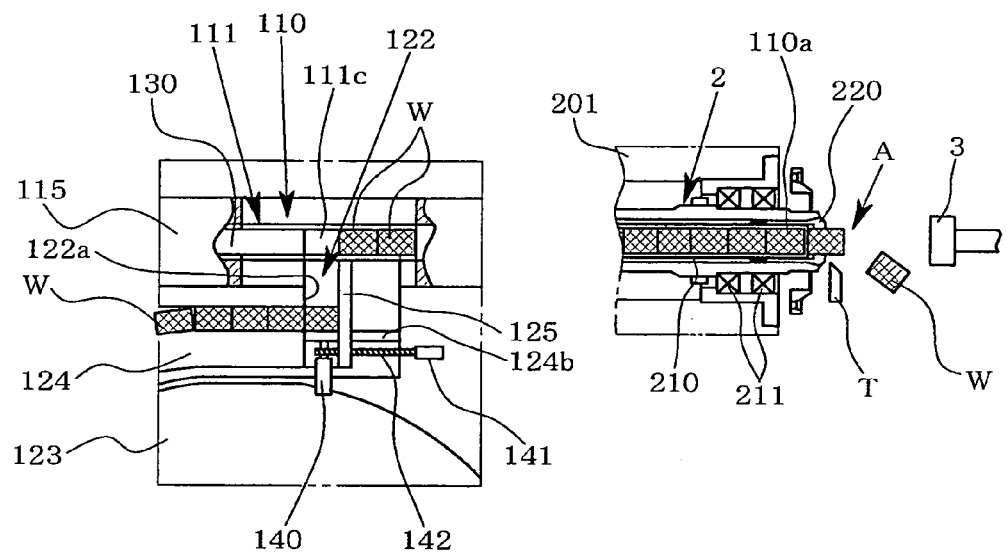
FIGS. 4A and 4B are views for explaining the operation of the work supply apparatus of this embodiment.

After the completion of processing of the work W, as shown in FIG. 3B, the tool T is evacuated from the work W. The work accommodation part 110 which has been retracted as mentioned above advances to a position at which the work W is supplied as mentioned above. While keeping the state that the processed work W is no longer held by the holding claw 220a, as shown in FIG. 3C, the work accommodation part supplies the work W to the operation position A by moving the pressing rod 130 forward. As shown in FIG. 4A, during the supply of the work W, the processed work W at the operation position A is pushed out by the work W which is to be supplied, and drops from the main spindle 2. Then, the work W is recovered by a work recover apparatus or the like, which is not shown. Then, the work which has been supplied to the operation position A is held by the chuck 220. Thereafter, as mentioned above, in the state where the work accommodation part 110 is retracted, the processing of the work W by means of an automatic lathe becomes possible.

Further, as shown in FIGS. 3B, C and FIG. 4A, it is possible to allow an abutting member 3 to abut against the processed work W from above the main spindle axial line C, and to supply the work W and recover the processed work W while holding the work W by the pressing rod 130 and the abutting member 3. In this case, positioning of the work W to be supplied to the operation position A can be conducted by the abutting member 3 through the processed work W. The abutting member 3, although not particularly shown, can be provided on a tool rest, a table stock, a counter headstock or the like.

In this embodiment, the work W is replenished at a position at which the work accommodation part 110 is retracted as mentioned above after the work W is supplied to the operation position A as mentioned above. Therefore, at the position where the work accommodation part 110 is retracted, the work input port 111 has the above-mentioned positional relationship relative to the reference surface 122a.

When the work W is supplied to the operation position A by means of the pressing rod 130, all of the works W within the work accommodation part 110 move forward for a distance which is equal to the length of a single work W. As shown in FIG. 4A, in the work accommodation part 110, a space 111c having a size which corresponds to a single work W is formed at a position counter to the work input port 111.

Figure 4B:
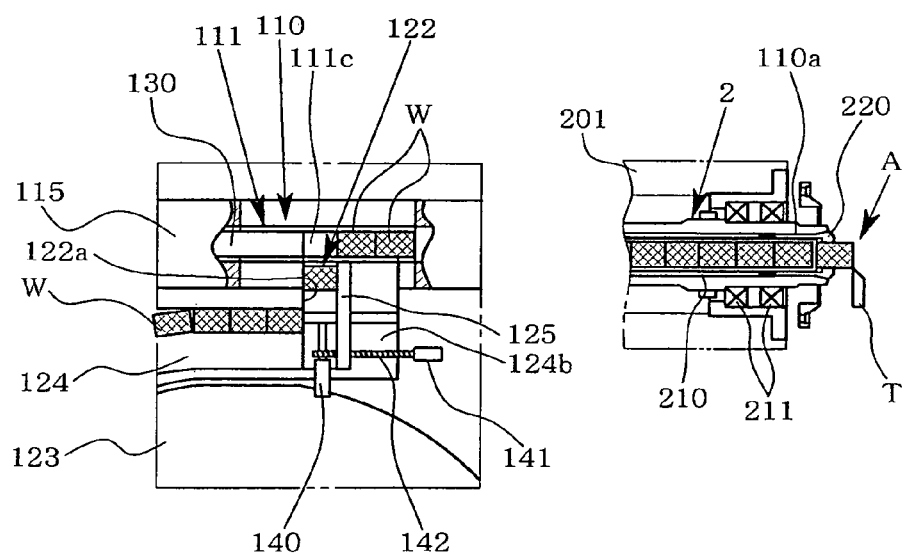

As a result, as shown in FIG. 4B, in the state where the pressing rod 130 is retracted, the work W is input to the space 111c through the work input port 111 as mentioned above, whereby the work W is supplied to the work accommodation part 110. After the replenishing of the work W, the pressing rod 130 may be moved forward, thereby to impart the work W in the work accommodation part 110 with a pressing force.

Thereafter, by repeating the operations shown in FIG. 3A to FIG. 4B, it is possible to conduct processing of the work W while continuously supplying the work W to the operation position A.

Further, as for the empty work accommodation part 110, it is also possible to replenish the accommodation part with the work W by inputting the work W to the work input port 111 by the work replenishing part 122 and by allowing the work which has been input to move forward within the work accommodation part 110 by means of the pressing rod 130. In this case, it is possible to move the work W which has been input to the work accommodation part 110 one by one by means of the pressing rod 130, or to move until the work W abuts against the front end of the work accommodation part 110 (stopper 110a) or the work W which has been accommodated.

Figure 5:
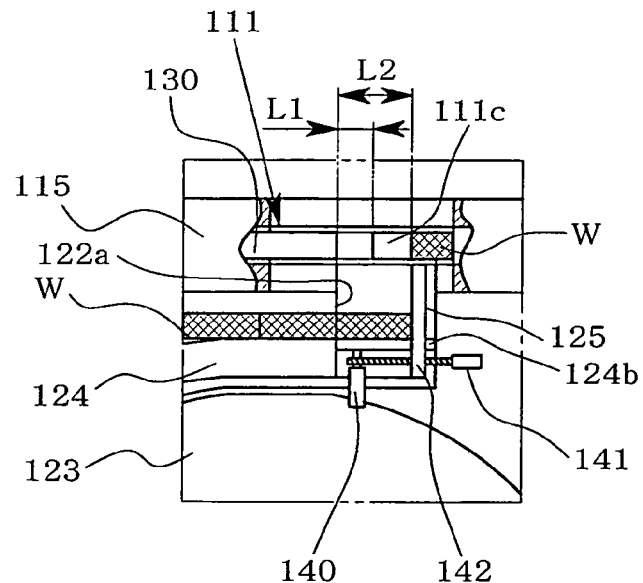
FIG. 5 is a view for explaining the operation of the work replenishing part when the length of a work is varied.

On the other hand, if the length of the work W to be processed is changed, and an operator inputs the length of the work W to the NC apparatus, the length L which is equal to the length of a single work W is automatically set according to the length of the work W which is input in the NC apparatus. For example, a shown in FIG. 5, the length which is equal to the length of a single work W is changed from L1 to L2 (L1<L2).

In this case, the position of the work positioning member 125 is adjusted such that the distance between the reference surface 122a and the work positioning member 125 becomes the length L2, and the movement amount of the pressing rod 130 is changed from L1 to L2 based on the distance between the reference surface 122a and the work positioning member 125. By allowing the work positioning member 125 to abut against a stopper such as a bolt, the work positioning member 125 may be positioned at a position corresponding to the length of the work W, i.e. L2.

In this case, since the positional relationship between the rear end edge 111a of the work input port 111 and the reference surface 122a is kept, it is possible to replenish the work W of which the length for a single work is L2, whereby new works W differing in length can be continuously supplied to the automatic lathe.

In particular, by allowing the width of the work input port 111 (the position of the front end edge 111b) to correspond to the length of the work W having the maximum length to be supplied to the automatic lathe in advance, the work W can be replenished more easily without changing the width of the work input port 111 such that it corresponds to the length of the work W.

Further, since the work accommodation part 110 is provided as a separated part which is distant from the work replenishing part 122 (work mounting plate 123), the back-and-forth movement of the work accommodation part 110 is conducted independently from the work replenishing part 122. Therefore, the work accommodation part driving mechanism can be simply configured as mentioned above, and the work accommodation part 110 can be moved stably.

Further, since the work replenishing part 122 is not required to move back and forth or the like, as a whole, the work mounting plate 123 can be provided such that it is fixed relative to the side where the work supply apparatus is provided, whereby the work W can be stably introduced from the parts feeder 120 and stably replenished to the work accommodation part 110.

In particular, since the work accommodation part 110 and the work replenishing part 122 are formed as separate bodies with a distance therebetween, if vibration or the like associated with the processing of the work W by the automatic lathe are transmitted to the work accommodation part 110, these vibration or the like are not transmitted directly to the work replenishing part 122, whereby the work W can be introduced or replenished stably, and noises or the like can be prevented from being generated.

On the other hand, if the work W is continuously supplied to the operation position A for predetermined number times without being supplied to the work accommodation part 110, the space 111c is formed in a quantity corresponding to the plurality of the works W.

In the work supply apparatus of the present invention, the distance between the work positioning member 125 and the reference surface 122a can be set such that it equals to the total lengths of the plurality of the works W.

Figure 6:
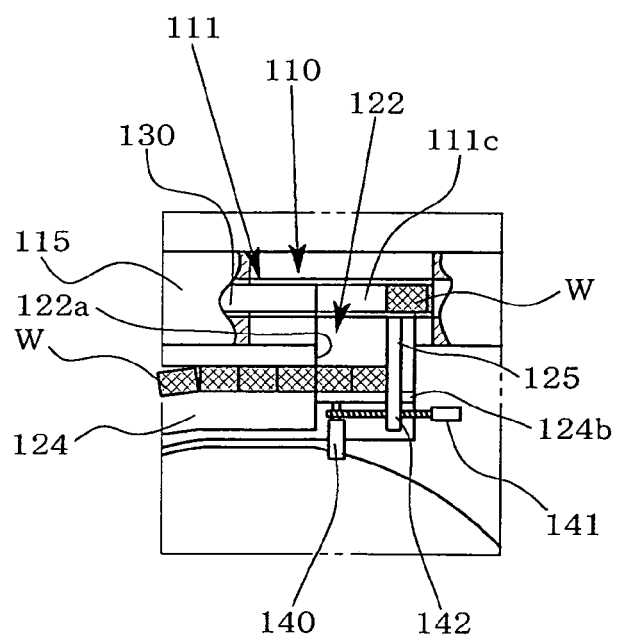
FIG. 6 is a view for explaining the operation of the work replenishing part when a plurality of number of works are supplied to the work accommodation part.

For example, as shown in FIG. 6, if the distance between the work positioning member 125 and the reference surface 122a is set such that it equals to the total lengths of two works W, the two works W are protruded from the reference surface 122a, whereby positioning is conducted by means of the work positioning member 125.

As a result, the two works W which have been positioned can be simultaneously replenished to the work accommodation part 110 by a single replenished by means of a pressing means 124b. In this case, the work input port 111 is required to have a size corresponding to the quantity of the works W to be replenished. The length corresponding to the plurality (two in the above-mentioned embodiment) of the works W is set to be a length which is two or more times larger than the length of the main spindle axial line C direction of the work W, with a predetermined value α' being added, so that the works W in a quantity larger than the intended quantity are not protruded from the work accommodation part 110, taking into consideration variations in length of each of the works W.

As mentioned above, in the present invention, it is possible to simultaneously replenish a plurality of works W from the work replenishing part 122 to the work accommodation part 110 by a single replenishment. The movement amount of the pressing rod 130 can be set such that it is equal to the length of a single work W or two or more times larger than L according to the supply operation of the work W to the operation position A.

The preferred embodiment of the present invention has been explained hereinabove, however, the present invention is not limited to the above-mentioned embodiment.

For example, in the above explanation, a single work W is pressed out to the operation position from the work accommodation part 110 by allowing the pressing rod 130 to move forward for a distance which is equal to the length L of a single work W. However, in spite of the quantity of works W to be replenished to the work accommodation part 110 one time, by allowing the pressing rod 130 to move forward for a distance which is equal to the total lengths of a plurality of works, the plurality of works W can be pressed out to the operation position simultaneously from the work accommodation part 110.

Further, it is possible to configure the apparatus such that the pressing rod driving means is composed of a cylinder or the like, a pressing rod stopper which integrally or cooperatively move with the work positioning member 125 is provided as the movement amount adjusting member, and the movement amount of the pressing rod 130 is adjusted based on the distance between the reference surface 122a and the work positioning member 125 by allowing the pressing rod 130 to abut against the pressing rod stopper. As the pressing rod stopper, in addition to the work positioning member 125 itself or a stopper member provided near the work positioning member 125, the abutting member 3 or the like can be used. If the abutting member 3 is used as the pressing rod stopper, the movement amount of the pressing rod 130 is adjusted by abutting against the pressing rod stopper through the work.

Figure 7:
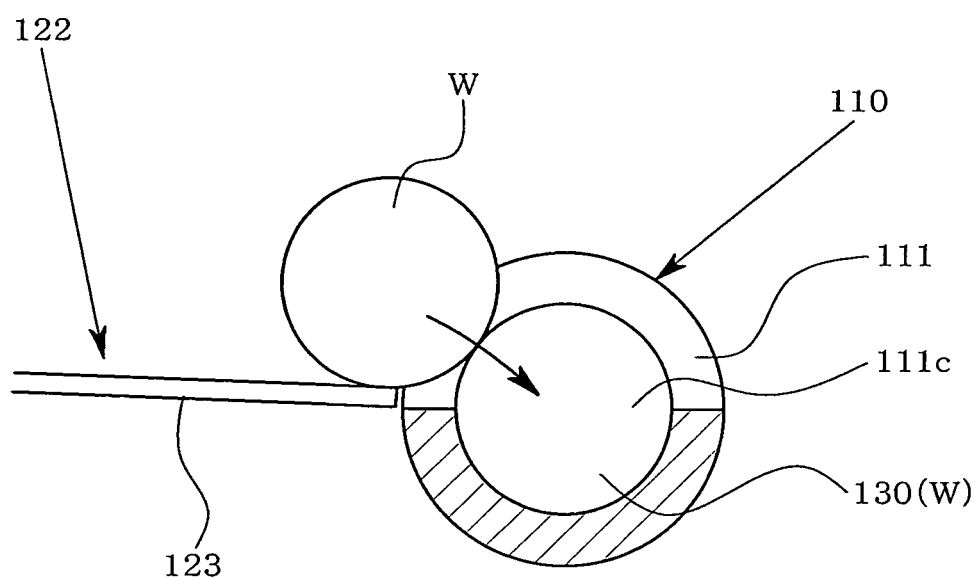
FIG. 7 is a view for explaining a still another embodiment of the work supply apparatus of the present invention.

In the above embodiment, the work W is pressed out from the work replenishing part 122 to the work accommodation part 110 by the movement of the pressing member 124b by the cylinder 140. As shown in FIG. 7, the work replenishing part 122 is formed on the work mounting plate 123 which is obliquely provided so that the work W is input to the work input part 111 while rolling on the slope. In this case, the work W on the work replenishing part 122 can be in the stand-by state for replenishment by abutting against the pressing rod 130 or the work W accommodated in the work accommodation part 110.

INDUSTRIAL APPLICABILITY

The work supply apparatus of the present invention can be applied to all cases in which the works with the same shapes are continuously supplied to the operation position such as a processing position or an assembly position. Therefore, it can be applied not only to the continuous supply of works in a machine tool such as a lathe or a pressing machine, but also to the continuous supply of works in the assembly of equipment or the like.

The invention claimed is:

1. A work supply apparatus comprising;
a work accommodation part in which a plurality of works is accommodated and aligned,
a pressing member for pressing the plurality of works accommodated within the work accommodation part to push a predetermined number of the plurality of works out from the work accommodation part to thereby form a space at a tail end of the plurality of works in the work accommodation part,
a work replenishing part for replenishing the works into the space of the work accommodation part,
having a work positioning member for positioning the work to a position to be introduced in the space of the work accommodation part,
a position adjusting device connected to the work positioning member to adjust a position of the work positioning member relative to a reference position of the work according to a length of the work and a quantity of the works, to be replenished, and
a movement amount adjusting device connected to the pressing member to adjust an amount of movement of the pressing member based on a distance between the reference position and the work positioning member.

2. The work supply apparatus according to claim 1, wherein the work positioning member is positioned at a position that is away from the reference position for a distance which is equal to total lengths of the works to be replenished at one time and the pressing member moves for a distance that is equal to a length of a single work such that the single work is pushed out from the work accommodation part.

3. The work supply apparatus according to claim 1, further comprising a work moving device for moving the work which has been positioned by the work positioning member towards the space of the work accommodation part.

4. The work supply apparatus according to claim 1, wherein the work replenishing part is formed as a separate part which is distant from the work accommodation part.

5. The work supply part according to claim 1, wherein the work accommodation part is provided to move back and forth such that the plurality of works in the work accommodation part and the work pushed out from the work accommodation part to an operation position are distant from each other.

6. A machine tool comprising:
the work supply apparatus according to claim 1.

7. The machine tool according to claim 6, wherein an operation position is a position where the work is held by the machine tool.

8. The work supply part according to claim 1, further comprising a work moving device for replenishing the works positioned with the work positioning member in the space of the work accommodation part,
wherein the work replenishing part has a work introduction portion, and the work moving device extends in a work introduction direction from the work introduction portion and moves in a direction perpendicular to the work introduction direction, and
the work positioning member is arranged apart from the work introduction portion.

9. The work supply part according to claim 8, wherein the work replenishing part includes a work mounting plate for mounting the works,
the work positioning member includes a notch portion formed at a lower portion thereof, and
the work moving device extends through the notch portion on the work mounting plate, and slides on the work mounting plate along the notch to replenish the works positioned with the work positioning member in the space of the work accommodation part.

10. The work supply part according to claim 9, wherein the work replenishing part includes side walls protruding from the work mounting plate to form a work introduction path communicated with the work introduction portion.

11. The work supply part according to claim 1, wherein the work replenishing part includes a work mounting plate for mounting the works, and the work mounting plate is inclined such that the works positioned with the work positioning member rotatably move in the space of the work accommodation part.

* * * * *

UNITED STATES PATENT AND TRADEMARK OFFICE
CERTIFICATE OF CORRECTION

PATENT NO. : 9,138,810 B2  
APPLICATION NO. : 13/138702  
DATED : September 22, 2015  
INVENTOR(S) : Masaaki Masuda Page 1 of 1

It is certified that error appears in the above-identified patent and that said Letters Patent is hereby corrected as shown below:

In the Claims

Please correct on column 12, line 11, to -- The work supply [[part]] apparatus according to claim --.
Please correct on column 12, line 21, to -- The work supply [[part]] apparatus according to claim --.
Please correct on column 12, line 32, to -- The work supply [[part]] apparatus according to claim --.
Please correct on column 12, line 42, to -- The work supply [[part]] apparatus according to claim --.
Please correct on column 12, line 46, to -- The work supply [[part]] apparatus according to claim --.

Signed and Sealed this
Sixteenth Day of February, 2016

Michelle K. Lee
*Director of the United States Patent and Trademark Office*